United States Patent [19]

Alburger

[11] 3,928,046

[45] Dec. 23, 1975

[54] BRIGHTENER ADDITIVE FOR INSPECTION PENETRANT DEVELOPERS

[76] Inventor: James R. Alburger, 5007 Hillard Ave., La Canada, Calif. 91011

[22] Filed: Jan. 17, 1974

[21] Appl. No.: 434,228

[52] U.S. Cl. .......... 106/19; 106/287 R; 252/301.2 P
[51] Int. Cl.² ......................................... C09D 11/00
[58] Field of Search .... 252/301.2 P; 106/19, 287 R; 73/104

[56] References Cited
UNITED STATES PATENTS

| | | | |
|---|---|---|---|
| 3,560,399 | 2/1971 | Irsak | 252/301.2 P |
| 3,748,469 | 7/1973 | Molina | 252/301.2 P |
| 3,777,157 | 12/1973 | Molina | 252/301.2 P |

OTHER PUBLICATIONS

Chem. Abst. 72: 114323Z, 1970.

*Primary Examiner*—Theodore Morris

[57] ABSTRACT

A brightener additive for an inspection penetrant developer consisting of a pyrrolidone-type material. The presence of the brightener additive in the developer acts to intensify the fluorescent brightness response or color of flaw indications.

8 Claims, No Drawings

BRIGHTENER ADDITIVE FOR INSPECTION PENETRANT DEVELOPERS

RELATED PATENTS

U.S. Pat. No. 3,386,920, "Process for Fluorescence Detection of Extremely Small Flaws." (Now Reissue No. Re. 26,888)

U.S. Pat. No. 3,557,015, "Dual-Sensitivity Dyed Liquid Tracers."

U.S. Pat. No. 3,607,333, "Developers for Inspection Penetrants Employing Fusible Waxes."

U.S. Pat. No. 3,715,227, "Inspection Penetrant Development Process Employing Fusible Waxes."

This invention relates to developers as used in the inspection penetrant process. More particularly, the invention relates to developer compositions which exhibit features of enhanced fluorescent brightness or color response of flaw indications.

Heretofore, inspection penetrant developers have been comprised essentially of fine powders or pigments in particulate form. In some cases, the pigment constituent of the developer dissolves in a carrier liquid and is precipitated out of solution (as a pigment coating) when the carrier liquid evaporates. In general, it may be said that the pigment particles of a developer are utilized in any one of three forms: (1) as a dry powder, (2) as a suspension (or solution) of the pigment particles in water, and (3) as a suspension of the pigment particles in a nonaqueous volatile solvent liquid such as an alcohol or a chlorinated hydrocarbon.

The inspection penetrant process is employed in the nondestructive testing for surface flaws in critical parts such as aircraft structural members, jet engine turbine blades, bearings, and the like. Parts to be tested for the presence of potential failure flaws are treated with a liquid penetrant containing a dissolved indicator dye or dyes. The preferred indicator dye component for in-plant penetrant usage is fluorescent in character, and the preferred indicator dye component for field inspection penetrant usage is visible-red in character.

Usually, the penetrant process involves four steps: (1) penetrant application and dwell on the test parts (2) removal of surface penetrant leaving entrapments of penetrant in crack defects, (3) developer application, and (4) inspection for the presence of flaw indications. Sometimes, when describing the inspection penetrant process, the step (3) of developer application is considered as being part of the inspection step (4).

The developer compositions of the present invention are primarily intended for use in connection with fluorescent penetrants (i.e. those which contain fluorescent indicator dyes), although they may also be used in connection with penetrants containing visible-color dyes. Any of the known and commonly used indicator dyes will function in accordance with the invention, including the various "sensitizer" dyes which are disclosed in my U.S. Pat. No. 3,386,920, for "Process for Fluorescence Detection of Extremely Small Flaws", now Reissue No. Re. 26,888, "Process for Fluorescence Detection of Extremely Thin Tracer Films". In addition, the various dyes and combinations of dyes which are disclosed in my U.S. Pat. No. 3,557,015, for "Dual-Sensitivity Dyed Liquid Tracers", will function properly with the developer compositions of the invention.

Any of the known penetrant materials may be used in conjunction with the developer compositions of the invention. That is, the penetrant may be of the water-washable type, or it may be of the post-emulsifiable type. In any event, a dyed liquid penetrant is applied to a test surface, either by spray, brushing, or dipping, and then after a suitable dwell time during which the penetrant enters any surface cracks which may be present, excess penetrant is removed by washing with a spray of water in the case of water-washable penetrants, or by treatment with an emulsifier followed by washing with water, in the case of post-emulsifier-type penetrants.

Another modification of the penetrant process is the so-called solvent-remover process, in which surface penetrant is removed from test parts by application of a solvent liquid such as kerosene, alcohol, or other suitable material. In any case, removal of surface penetrant is an essential step in the inspection penetrant process, so that the surface of the test part may be relatively clean, leaving entrapments of penetrant in surface cracks.

Finally, the test parts are inspected for the presence of entrapments of penetrant in or exuding from crack defects. Sometimes it is possible to see such entrapments by their color or fluorescence, and without any "development". However, it is common practice to apply a developer to the test surface being inspected so as to first draw out any penetrant which is trapped down in a crack below the surface of the part, and second to augment the effective brightness or color intensity of the entrapment by increasing the apparent thickness of the dyed liquid film generated by the penetrant entrapment.

The usual procedure employed in developing flaw indications on test surfaces is to apply a thin coating of developer onto the test surfaces. This can be done in any one of several ways, and the particular method employed depends on the type of developer which is used. "Dry"-type developers consist of a pigment material; silica aerogel or a mixture of aerogel and talc, barytes, clay, magnesium sulfate, magnesium oxide, diatomaceous earth, or silica. Dry developers are usually formulated so as to be light fluffy powders which can be dusted onto test surfaces, or test parts may be dipped into a tank containing the powder. The powder adheres to the test surface at points where entrapments of penetrant exude from crack defects.

In the case of water-suspended wet-type developers, any one or a combination of the above-identified pigments may be suspended as a thin slurry in water. Usually, a wetting agent is included in the developer composition to aid in uniform wetting of test surfaces, but this ingredient may sometimes be omitted. Test parts are dipped in the developer slurry, and are allowed to drain and dry. A thin coating of pigment material becomes deposited on the test surface, and entrapments of penetrant exude and are absorbed into this pigment coating, showing as localized indications.

In the case of solvent-suspended (nonaqueous-type) developers, any one or a combination of the above-identified pigment materials is suspended in a volatile solvent carrier, the solvent being a material such as a chlorinated hydrocarbon; e.g. 1,1,1-trichloroethane, methylene chloride, and perchloroethylene, or an alcohol; e.g. methanol, ethanol, isopropanol, and butanol. The pigment material is suspended in the solvent carrier, and the developer mixture is applied to test surfaces in the form of a fine spray. Although the solvent is volatile and evaporates rapidly, the test surface is momentarily wetted by the solvent, with the result that entrapments of penetrant are drawn out of crank defects, assisted by the solvent action of the developer carrier liquid, and are then absorbed onto the pigment particles on the test surface.

Still another type of developer is that which is disclosed and claimed in my U.S. Pat. No. 3,607,333, for "Developers for Inspection Penetrants Employing Fusible Waxes," and U.S. Pat. No. 3,715,227, for "Inspection Penetrant Development Process Employing Fusible Waxes". In developers of this type, the "pigment" constituent is sodium benzoate. This sodium benzoate ingredient is dissolved in water to form a clear solution, but when the solution is applied to a test surface, the coating of liquid dries and sodium benzoate precipitates on the test surface as an amorphous "pigment" which is capable of absorbing exuded entrapments of penetrant.

As stated above, the function of a developer is to enhance the effective brightness or see-ability of defect indications, and developer performance in this regard depends on at least two factors, (1) the characteristic of absorption or solvent action which serves to draw the entrapment out of a crack defect, and (2) the characteristic of build-up of the apparent film thickness of the entrapment by absorption onto particles of pigment powders coated on the test surface.

I have discovered a third factor which is significant with respect to enhancement of see-ability of flaw indications. I have found that certain "brightener" additives may be included in a developer formulation, thereby providing a substantial enhancement in the see-ability of flaw indications. With regard to the development of fluorescent flaw indications, the degree of brightness enhancement provided by the brightener additives of the invention may, in some cases, be as much as double that which is obtainable with developers which do not contain the additive material. Also, with regard to the development of visible-red flaw indications, the additives of the invention act to yield a significant improvement in the color saturation of the flaw indications.

The principal object of the invention, therefore, is to provide inspection penetrant developer compositions which exhibit improved brightness response of fluorescent indications and improved color saturation of visible-color indications.

This and other objects of the invention will in part be obvious and will in part become apparent from the following description thereof.

I have discovered that certain chemical materials exhibit a remarkably powerful effect of brightness enhancement when in contact with fluorescent dyes as used in fluorescent penetrants. They also act to intensify the color response of visible-color dyes as used in visible-color penetrants. These brightener additives include various of the pyrrolidone derivitives, typical materials being:

2-Pyrrolidone
N-Methyl-2-pyrrolidone
N-Vinyl-2-pyrrolidone
1.5-Dimethyl-2-pyrrolidone
3.3-Dimethyl-2-pyrrolidone In use, a pyrrolidone brightener additive of the invention may be included in a conventional pigmented developer composition to a proportional concentration as indicated in the examples given below. Then, when the developer is used in accordance with conventional procedures, being coated on the surface of a penetrant-treated test part, any entrapments of penetrant which are present in surface cracks are drawn out and are absorbed by the developer. The indicator dye in the penetrant, fluorescent or visible-color as the case may be, thereby comes in contact with the pyrrolidone ingredient in the developer, and the fluorescent brightness or color intensity becomes intensified by such contact.

The pyrrolidone brightener additives of the invention may be included in the developer composition by a simple process of mixing. In the case of dry-type and wet-type developers (the latter type being supplied in dry form), the pyrrolidone liquid may be mixed with a small portion of the developer to form a crumbly mass of moist pigment. This mass is then broken up and tumbled with the balance of the pigment until a uniform dispersion of pyrrolidone in pigment is obtained.

The wet-type developer is normally supplied in dry form, and is mixed with water by the user. Thus, when the wet developer is ready for use, the water contains pigment in suspension (or solution in the case of sodium benzoate) and pyrrolidone brightener in solution. When test parts are dipped into this wet mixture, drained and dried, the water evaporates leaving a thin coating of pigment particles which retain the relatively nonvolatile pyrrolidone material.

In the case of dry-type developers, the amount of pyrrolidone brightener additive present is so small that the pigment-pyrrolidone mixture retains its "dry" character. When dusted onto penetrant-treated test surfaces, particles of the "dry" pigment which adhere to exudations of penetrant contain small amounts of pyrrolidone, sufficient to provide the desired brightening action.

In the case of nonaqueous-type developers, these are normally supplied in liquid form packaged in aerosol spray cans. The pyrrolidone brightener additives of the invention may be dispersed or dissolved in the developer solvent carrier, and when the developer is sprayed onto a penetrant-treated test surface, the volatile solvent carrier evaporates leaving a thin coating of pigment particles on the test surface along with a small amount of the relatively nonvolatile pyrrolidone brightener material.

The proportional amount of brightener additive used in the compositions of the invention may vary considerably depending in part on the type of pigment material which is employed. For example, a light, fluffy powder such as silica aerogel is capable of absorbing more brightener liquid, based on weight percentages, as compared with a more dense pigment such as barytes. Weight percentages of brightener additive, relative to pigment solids, may vary from about 1% up to 50% or more. When the brightener additive is to be used in a dry developer, somewhat less additive is desirable, the preferred range of weight percentages being from about 1% up to about 20%. This is necessary so that the pigment may retain a reasonably fluffy character.

I have found that certain kinds of indicator dyes, notably Xanthene dyes such as Rhodamine BX, form intensely colored colutions in suitable solvents, but when the solvent evaporates the dye loses its color. In dyes of this kind, color depends on a linkage of the dye chromophore with a polar material such as water, alcohol, or glycol. Dyes of this kind are important for use as visiblecolor indicators in the dual-sensitivity penetrants of my above-mentioned U.S. Pat. No. 3,557,015. Thus, where dyes of this kind are to be utilized, I have found it desirable to include in the developer formulation a small amount of a glycol solvent additive. The presence of the glycol serves to maintain the desired color characteristic of the dye chromophore, and the pyrrolidone brightener additive acts to further intensify the color of the dye.

A generalized formulation for the developer compositions of the invention may be set forth as follows, proportional amounts being stated as weight percentages:

| | |
|---|---|
| Pigment | 10% to 90% |
| Pyrrolidone-type brightener | .5% to 20% |
| Wetting agent | Zero to 5% |
| Glycol | Zero to 5% |
| Carrier liquid | Zero to 89.5% |

In the foregoing formulation, the pigment may be any suitable particulate material as described above. Preferred pigments are those which have particle sizes in the range of from about 0.5 micron to about 5 microns, and which are translucent in character. Opaque pigments such as titanium dioxide are not suitable, since they tend to obscure color and quench the fluorescence of indications.

The wetting agent may be any water-soluble surfactant capable of lowering the surface tension of water mixtures. This ingredient may be omitted in the case of dry developers of nonaqueous-type developers. It is desirable for inclusion in nonaqueous developers so that dry coatings of developer may be more readily wash-removed from test parts after completion of inspection.

The glycol ingredient may be omitted unless the developer is to be used in conjunction with a visible-color indicator dye which requires chromophore-polar-solvent linkage. The glycol may be any normally liquid glycol, such as ethylene glycol, diethylene glycol, triethylene glycol, or hexylene glycol. Glycerin may also be employed as the "glycol" ingredient. The preferred glycol is diethylene glycol.

As pointed out above, the carrier liquid may be selected from the group of materials; water, alcohols, and halocarbons. Suitable carrier liquids are:

| | |
|---|---|
| methanol, | ethanol, |
| isopropanol, | butanol, |
| methylene chloride, | 1.1.1-trichloroethane, |
| perchloroethylene, and | water. |

It will be understood that where sodium benzoate is to be used as the "pigment" ingredient, the liquid carrier must be water. Otherwise, the liquid carrier, if used, is selected in accordance with the desired mode of usage. I make no restrictions on the liquid carrier which is to be used in the compositions of the invention, since any relatively volatile liquid may be employed. Those liquids which are mentioned above are those which have been in common use in the past. In formulations where a liquid carrier is employed, sufficient liquid must be utilized so as to produce a pigment slurry which will provide a satisfactory coating of pigment on test parts, or which will function well in spray cans, as desired.

EXAMPLE I

A dry developer was formulated as follows:

| | |
|---|---|
| N-Methyl-2-pyrrolidone | 10 cc. |
| Silica Aerogel | 40 pm. |

The pyrrolidone brightener was first dissolved in 400 cc. of methylene chloride, and the silica aerogel was added to make a thick slurry. The mixture was then poured into a large flat tray, and the methylene chloride was allowed to evaporate. The resulting "dry" powder, which retained the relatively nonvolatile brightener liquid, was sifted and tumbled so as to break up agglomerates.

This dry developer was applied in accordance with conventional practice to test parts treated with a fluorescent penetrant. When compared with a conventional silica aerogel dry developer containing no brightener additive, the dry developer of this example produced indications which appeared to be about five times brighter than were produced by the ordinary dry developer.

EXAMPLE II

A water-suspended wet developer was formulated as follows:

| | |
|---|---|
| Calcium carbonate (precipitated) | 250 gm. |
| Silica aerogel | 14 gm. |
| Wetting agent (Ethoxylated alcohol) | 20 cc. |
| N-Methyl-2-pyrrolidone (Brightener) | 60 cc. |
| Water to make | 1 gallon |

The above-listed ingredients were mixed to form a uniform slurry. Test parts were treated with a fluorescent post-emulsifier-type penetrant in accordance with conventional practice. After emulsification and washing, the test parts were dipped into the wet developer of this example, and were drained and dried. It was found that developed indications produced by the wet developer of this example were more than twice as bright as indications produced by a similar developer without the brightener ingredient.

It was found that the developer of this example could be packaged for shipment and delivery in "dry" form by tumbling the ingredients (except water) together to form a uniform mixture. For use, the "dry" mixture of powders could then be added to water in the proportion of about one half pound per gallon, and stirred to form a slurry.

If desired, a small amount of sodium chromate may be added to the above formulation to serve as a rust inhibitor. (1.5 gm. per gallon).

EXAMPLE III

A solvent-suspended nonaqueous developer was formulated as follows:

| | | |
|---|---|---|
| 1.1.1-Trichloroethane | 30 | gal. |
| Methylene chloride | 17.5 | gal. |
| Diethylene glycol | 1 | gal. |
| N-Methyl-2-pyrrolidone | 1 | gal. |
| Wetting Agent | .5 | gal. |
| Calcium carbonate | 69 | lb. |
| Silica aerogel | 3 | lb. |

In the above formulation, the liquid ingredients must be prepared first, and the mixture examined carefully to assure that a clear solution is obtained. The glycol ingredient is normally incompatible with Trichloroethane, and a solvent coupler (Methylene chloride) is necessary to render the ingredients mutually soluble.

After thorough mixing, the composition of this example was packaged in aerosol spray cans, using conventional Freon propellant materials. The thus-prepared spray cans were used in accordance with conventional practice for developing indications on test parts treated with either fluorescent penetrants or visible red penetrants. In both usages, it was found that fluorescent brightness and color intensity were substantially improved, as compared with a similar nonaqueous developer which contains no brightening agent.

Tests were made, developing indications on test parts which were treated with a dual-sensitivity penetrant of the type disclosed and claimed in my U.S. Pat. No. 3,557,015, and which utilizes Rhodamine BX as the visible-red dye component. It was found that the developed indications exhibited highly brilliant fluorescence response, while at the same time the visible-red color intensity did not fade as is normally the case with developers which contain no glycol material.

The foregoing formulation provides a nonaqueous developer which is nonflammable. For applications where it is desired that chlorine-containing ingredients shall be avoided, the two materials 1.1.1-trichloroethane and methylene chloride may be replaced by an equal volume of isopropanol.

EXAMPLE IV

A dissolved-pigment wet-type developer was formulated as follows:

| | | |
|---|---|---|
| Sodium benzoate | 800 | lb. |
| Sodium chromate (Pulverized) | 2 | lb. |
| Wetting agent (10 mol ethoxylated nonylphenol) | 6 | pints |
| Foam depressant | 6 | pints |
| N-Methyl-2-pyrrolidone | 2.5 | gal. |
| Water | 800 | gal. |

In the foregoing formulation, the wetting agent may be any water-soluble surfactant, and the foam depressant may be any one of the many foam breakers which are available commercially. The foam depressant may be omitted, but it is desirable that it be included since agitation of the developer mixture during use often tends to generate foam which may interfere with the formation of uniform coatings of developer liquid on test surfaces.

This formulation may be prepared and packaged in "dry" form by mixing the various ingredients (except water) and tumbling them until a uniform mixture is obtained. The liquid components of the formulation may be sprinkled into the sodium benzoate, while the latter is being tumbled or stirred as in a ribbon mixer. The finished "dry" composition may be packaged in fiber cartons for shipment to the user, and the user may then mix the dry powder composition with water to an appropriate concentration which may range from about a half pound per gallon up to the saturation point of solution, which may be about two pounds per gallon. A preferred concentration is about one pound per gallon.

Tests of the above developer composition showed that it was effective as a developer on parts treated with post-emulsifier-type fluorescent penetrants, and that it yielded extremely bright indications, more than twice as bright as were obtainable with a similar wet developer which did not contain the brightening additive.

It will be understood that in all of the foregoing formulations, any of the stated pyrrolidone-type brighteners may be utilized. Also, the pigments employed may be selected from the list of stated materials and used selectively, singly, and in combination.

It will be understood that in stating the various preferred formulations, all of which fall within the bounds of the above-stated generalized formulation, weight measures in grams or pounds may be considered to be equivalent to volume measures in cc. or pints respectively. It will also be understood that the pyrrolidone-type material is the essential brightener ingredient of the invention, and this may be added to any known developer to a proportional weight concentration within the range of about 0.5% to 20%, relative to pigments solids in the developer.

It will be seen from the foregoing specification that I have devised a new and novel improvement in developer compositions for use in the inspection penetrant process. Although the invention has been described with respect to specific embodiments thereof, it will be understood that various changes and modifications may be made without departing from the spirit of the invention and the scope of the appended claims.

I claim:

1. In an inspection penetrant process in which a dyed liquid penetrant is applied to test parts, surface penetrant is removed leaving entrapments of said dyed penetrant liquid in any surface flaws, a developer is applied to said test parts, and said parts are inspected for residual entrapments of penetrant liquid in said surface flaws, the improvement wherein said developer is comprised essentially of the following formulation, stated in weight percentages:

| | |
|---|---|
| Pigment | 10% to 90% |
| Pyrrolidone-type brightener | .5% to 20% |
| Wetting agent | Zero to 5% |
| Glycol | Zero to 5% |
| Carrier liquid | Zero to 89.5% | said pigment being at least one member selected from the group consisting of:
 Talc,
 Calcium carbonate,
 Magnesium oxide,
 Magnesium sulfate,
 Silica,
 Silica aerogel,
 Clay,
 Diatomaceous earth,
 Barytes, and
 Sodium benzoate;
said pyrrolidone-type brightener being at least one member of the group consisting of:
 2-Pyrrolidone,
 N-methyl-2-pyrrolidone,
 N-Vinyl-2-pyrrolidone, and
 3.3-Dimethyl-2-pyrrolidone; and
said carrier liquid being at least one member of the group consisting of:
 methanol,
 ethanol,
 isopropanol,
 Butanol,
 Methylene chloride,
 1.1.1-Trichloroethane,
 Perchloroethylene, and
 Water:

each of said pigment, brightener and carrier liquid ingredients being employed selectively, singly, and in combination.

2. A process in accordance with claim 1 in which said developer is a dry developer composition comprised essentially of the following formulation, stated in proportional parts by weight:

| | |
|---|---|
| Silica aerogel (pigment) | 40 parts |
| N-Methyl-2-pyrrolidone | 10 parts |

3. A process in accordance with claim 1 in which said developer is a water-suspendable wet developer composition supplied in dry form for mixing in water, comprised essentially of the following formulation stated in proportional parts by weight:

| | |
|---|---|
| Calcium carbonate (precipitated) | 250 parts |
| Silica aerogel | 14 parts |
| Wetting agent | 20 parts |
| N-Methyl-2-pyrrolidone | 60 parts |

4. A process in accordance with claim 1 in which said developer is a water-soluble wet developer composition supplied in dry form for mixing in water, comprised essentially of the following formulation stated in proportional parts by weight:

| | |
|---|---|
| Sodium benzoate | 800 parts |
| Wetting agent | 6 parts |
| N-Methyl-2-pyrrolidone | 20 parts |

5. A process in accordance with claim 1 in which said developer is a solvent-suspended nonaqueous developer composition comprised essentially of the following equivalent formulation:

| | | |
|---|---|---|
| 1.1.1-Trichloroethane | 30 | gal. |
| Methylene chloride | 17.5 | gal. |
| Diethylene glycol | 1 | gal. |
| N-Methyl-2-pyrrolidene | 1 | gal. |
| Wetting agent | .5 | gal. |
| Calcium carbonate | 69 | lb. |
| Silica aerogel | 3 | lb. |

6. A process in accordance with claim 1 in which said developer is a solvent-suspended nonaqueous developer composition comprised essentially of the following equivalent formulation:

| | | |
|---|---|---|
| Isopropanol | 47.5 | gal. |
| Diethylene glycol | 1 | gal. |
| N-Methyl-2-pyrrolidone | 1 | gal. |
| Wetting agent | .5 | gal. |
| Calcium carbonate | 69 | lb. |
| Silica aerogel | 3 | lb. |

7. In an inspection penetrant process in which a dyed liquid penetrant is applied to test parts, surface penetrant is removed leaving entrapments of said dyed penetrant liquid in any surface flaws, a pigmentcontaining developer is applied to said test parts, and said parts are inspected for residual entrapments of penetrant liquid in said surface flaws, the improvement wherein a pyrrolidone-type brightener material is added to said developer to a relative concentration within the range of about 0.5% to 20%, relative to pigment solids, said pyrrolidone-type material being at least one member selected from the group consisting of:
2-Pyrrolidone,
N-Methyl-2-pyrrolidone,
N-Vinyl-2-pyrrolidone, and
3,3-Dimethyl-2-pyrrolidone.

8. A process in accordance with claim 7 in which said pyrrolidone-type material is N-Methyl-2-pyrrolidone.

* * * * *